United States Patent [19]

Gallitzendörfer et al.

[11] 4,353,111
[45] Oct. 5, 1982

[54] MOTOR VEHICLE WITH A REARWARD SWING-UP BODY MEMBER

[75] Inventors: Josef Gallitzendörfer; Gerard Cardiet; Johann Tomforde, all of Sindelfingen, Fed. Rep. of Germany

[73] Assignee: Daimler-Benz Aktiengesellschaft, Stuttgart, Fed. Rep. of Germany

[21] Appl. No.: 211,902

[22] Filed: Dec. 1, 1980

[30] Foreign Application Priority Data

Dec. 1, 1979 [DE] Fed. Rep. of Germany ....... 2948524

[51] Int. Cl.³ .............................................. B60Q 1/00
[52] U.S. Cl. ....................................... 362/80; 296/76; 296/56; 296/146; 15/250.3
[58] Field of Search ................... 296/76, 146, 106, 56, 296/185, 195; D12/196, 91; 362/80; 15/250.3

[56] References Cited

U.S. PATENT DOCUMENTS

| | | | |
|---|---|---|---|
| 2,104,539 | 1/1938 | Hacker | 296/76 |
| 3,474,411 | 10/1969 | Collins | 362/80 |
| 3,851,867 | 12/1974 | Fricko | 296/56 |
| 4,153,928 | 5/1979 | Speedy | 362/80 |

FOREIGN PATENT DOCUMENTS

| | | |
|---|---|---|
| 895109 | 7/1949 | Fed. Rep. of Germany . |
| 2440695 | 3/1976 | Fed. Rep. of Germany ........ 296/56 |
| 2940898 | 4/1980 | Fed. Rep. of Germany ........ 296/76 |

Primary Examiner—Robert R. Song

[57] ABSTRACT

A motor vehicle which includes a rearward body end member which is adapted to be swung upwardly about a transverse axis of the vehicle. The body end member consists essentially of a synthetic resinous material and includes a rear window and an end wall. Lighting elements such as, for example, taillights, brake lights, flashers, back-up lights, or the like, are arranged on a side of the body end member facing an interior of the vehicle. The body end member is transparent in an area of the lighting elements so as to enable light to be visible from an exterior of the vehicle.

9 Claims, 3 Drawing Figures

MOTOR VEHICLE WITH A REARWARD SWING-UP BODY MEMBER

The present invention relates to a motor vehicle and, more particularly, to a motor vehicle which includes a rearward body end or deck member, consisting of a synthetic resinous material, which is adapted to be swung up about a transverse vehicle axle and includes a rear window and an end wall.

A motor vehicle of the aforementioned type which includes a body end member, i.e., a so-called hatchback, has been proposed in German Pat. No. 895,109.

The aim underlying the present invention essentially resides in further developing the body end member of the aforementioned type in such a manner that lighting elements arranged at a rear of the vehicle are located so that an especially satisfactory construction is achieved in both technical and stylistic respects.

In accordance with advantageous features of the present invention, the lighting elements such as, for example, the taillights, brake lights, flashers, or the like, on a side facing an interior of the vehicle are transparent in this zone.

In accordance with the present invention, diffuser lenses of the lighting elements are integrally constructed with the body end member in the lamp housings and are attached and mounted from the inside. Thus, diffuser lenses which must be separately manufactured, mounted, and sealed are eliminated in accordance with the present invention leading to an especially economical production and assembly.

Preferably, in accordance with further features of the present invention, outer light emission areas of the lighting elements are within a wiping range of a window wiper which also simultaneously sweeps over the rear window. This results in an additional advantage that, by means of a rear window wiper which, in many cases, is provided anyway, the rearward lighting elements can be simultaneously kept free of dirt as well without any additional expenditure.

In accordance with further advantageous features of the present invention, the provision is made that the lighting elements additionally exhibit downwardly oriented light emission areas which, when the body end member is swung upwardly, are visible from the rear. By virtue of such an arrangement, it is ensured that even if the vehicle is occasionally driven with the body end member pivoted upwardly such as, for example, when transporting bulky loads, full traffic safety is nevertheless preserved.

It is also possible in accordance with the present invention, to arrange the lighting elements integrally within the vehicle in such a manner that, with the body end member closed, the lighting elements are covered by a transparent zone of the body end member. Additionally, in this case, the above-noted advantages are fully retained such as the features that the lighting elements are swept by an already included rear window wiper and the visibility afforded the body end member when such end member is swung into an upward position.

The aim underlying the present invention essentially resides in providing a motor vehicle with a rearward swing-up body end member which avoids, by simple means, shortcomings and disadvantages encountered in the prior art.

Another object of the present invention resides in providing a motor vehicle with a rearward swing-up body end member which ensures the cleansing of light-emitting areas disposed on the deck member.

A further object of the present invention resides in providing an automotive vehicle with a rearward swing-up body end member which eliminates the need for separate diffuser lenses for lighting elements.

Another object of the present invention resides in providing an automotive vehicle with a rearward swing-up body end member which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein.

Figure 1:
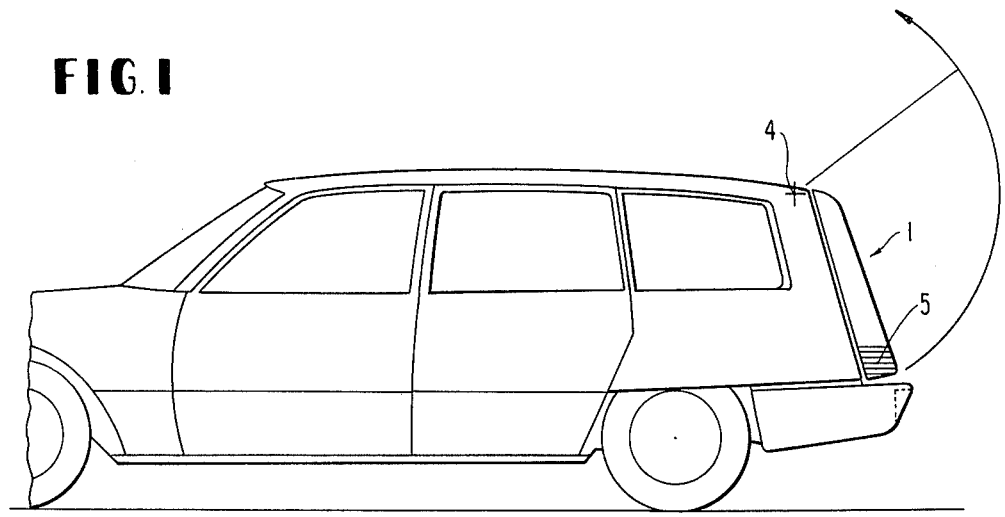
FIG. 1 is a partially schematic lateral view of a dual purpose vehicle provided with a body end member constructed in accordance with the present invention.
Figure 2:
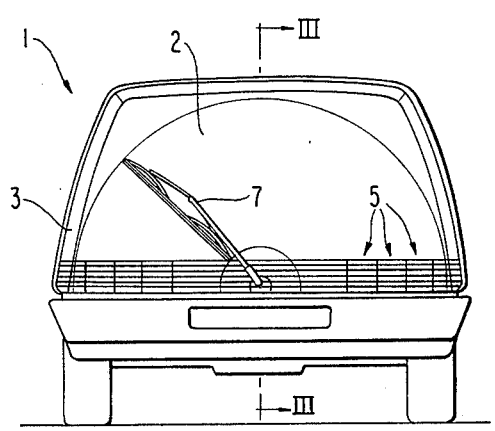
FIG. 2 is a rear view of the vehicle of Figure.

Referring now to the drawings wherein like reference numerals are used throughout the several views to designate like parts and, more particularly, to FIGS. 1 and 2, according to these figures, a dual purpose vehicle such as a station wagon, includes a rearward body end member 1 consisting entirely of a synthetic resinous material and simultaneously constituting a rear window 2 and, in marginal zones thereof, an end wall 3. The body end member 1 is adapted to be swung upwardly about an axle 4 arranged in a roof region of the vehicle, with the axle 4 extending transversely of the vehicle. Lighting elements 5 are arranged in a lower zone of the body end member 1.

Figure 3:
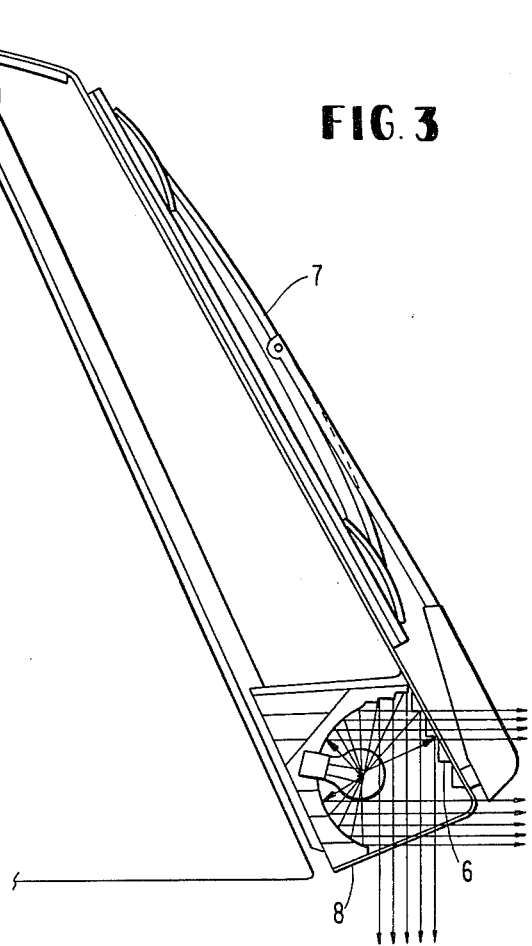
FIG. 3 is a cross-sectional view, on an enlarged scale, taken along the line III—III in FIG. 2.

As shown most clearly in FIG. 3, lighting elements 5 are provided with diffuser lenses 6 which are integrally formed with the body end member, that is, are molded into the latter. In a manner not shown in detail, lamp housings (not shown) are attached and mounted to the body end member 1 from an interior side of the body end member 1. A window wiper 7 is provided for sweeping over the rear window 2 and simultaneously sweeping over the light-emitting areas of the lighting elements 5 so as to keep dirt off the rearwardly oriented light-emitting areas. The lighting elements 5 are also provided with downwardly directed light-emitting areas 8 which, with an upwardly pivoted body end member 1, are disposed approximately vertically so as to ensure that the lighting elements 5 are fully recognizable from the rear even with the body end member 1 in the upright position. The possible light-emitting directions are indicated in FIG. 3 of the drawings by the arrows.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A motor vehicle comprising a rearward body end member adapted to be swung upwardly about a transverse axis of the vehicle, the body end member consisting essentially of a synthetic resin and including a rear window and an end wall, characterized in that the lighting elements are arranged on a side of the body end member facing an interior of the vehicle, and in that the body end member has a transparent zone in the area of the lighting elements for defining light-emitting areas for the lighting elements.

2. A motor vehicle according to claim 1, characterized in that the lighting elements include diffuser lense means, and in that the diffuser lense means are integrally formed with the body end member.

3. An automotive vehicle according to one of claims 1 or 2, characterized in that the lighting elements include lamp housing means, and in that the lamp housing means are attached and mounted on an inside of the body end member.

4. An automotive vehicle according to claim 3 with a window wiper means for wiping the rear window, characterized in that the light-emitting areas of the lighting elements lie in a wiping range of the window wiper means so as to enable the window wiper means to simultaneously sweep over the light-emitting areas and the rear window.

5. An automotive vehicle according to claim 4, characterized in that additional light-emitting areas are provided for the lighting elements, said additional light-emitting areas being oriented in a downward direction when the body end member is in a closed position and being visible from a rear of the vehicle when the body end member has been swung into an upward position.

6. An automotive vehicle according to claim 5, characterized in that the lighting elements include at least one of taillights, brake lights, flasher lights, and back-up lights.

7. An automotive vehicle according to claim 1, characterized in that the lighting elements are integrated into the vehicle, and in that the lighting elements are covered by the transparent zone of the body end member when the body end member is closed.

8. An automotive vehicle according to claim 7 with a window wiper means for wiping the rear window, characterized in that the light-emitting areas of the lighting elements lie in a wiping range of the window wiper means so as to enable the window wiper means to simultaneously sweep over the light-emitting areas and the rear window.

9. An automotive vehicle according to claim 8, characterized in that the lighting elements include at least one of taillights, brake lights, flasher lights, and back-up lights.

* * * * *